(12) United States Patent
Issari

(10) Patent No.: US 7,230,047 B2
(45) Date of Patent: Jun. 12, 2007

(54) REFORMABLE COMPOSITIONS

(75) Inventor: Bahram Issari, Glastonbury, CT (US)

(73) Assignee: Henkel Corporation, Rocky Hill, CT (US)

( * ) Notice: Subject to any disclaimer, the term of this patent is extended or adjusted under 35 U.S.C. 154(b) by 522 days.

(21) Appl. No.: 10/718,717

(22) Filed: Nov. 24, 2003

(65) Prior Publication Data

US 2004/0266940 A1    Dec. 30, 2004

(51) Int. Cl.
*C08G 18/42* (2006.01)

(52) U.S. Cl. .................. 524/500; 524/502; 524/506; 524/507; 524/514; 524/515; 524/529

(58) Field of Classification Search .............. 524/500, 524/502, 506, 507, 514, 515, 529
See application file for complete search history.

(56) References Cited

U.S. PATENT DOCUMENTS

| 3,159,601 A | 12/1964 | Ashby | 260/46.5 |
|---|---|---|---|
| 3,159,662 A | 12/1964 | Ashby | 260/448.2 |
| 3,220,970 A | 11/1965 | Carlström et al. | 260/37 |
| 3,516,946 A | 6/1970 | Modic | 252/429 |
| 3,814,730 A | 6/1974 | Karstedt | 260/46.5 |
| 4,714,739 A | 12/1987 | Arkles | 525/92 |
| 4,954,195 A | 9/1990 | Turpin | 156/242 |
| 5,709,948 A | 1/1998 | Perez et al. | 428/413 |
| 5,834,537 A | 11/1998 | Gotro et al. | 523/440 |
| 5,866,258 A | 2/1999 | Lucas | 428/424.2 |
| 5,952,416 A | 9/1999 | Tani et al. | 524/413 |
| 5,980,923 A | 11/1999 | Dillon | 424/402 |
| 6,013,715 A | 1/2000 | Gornowicz et al. | 524/492 |
| 6,225,373 B1 | 5/2001 | Gotro et al. | 523/206 |

*Primary Examiner*—Edward J. Cain
(74) *Attorney, Agent, or Firm*—Steven C. Bauman

(57) ABSTRACT

The present invention relates to curable elastomer compositions and deformable thermoplastic compositions which are reshapable subsequent to cure or solidification. In particular, the present invention relates to compositions and articles of manufacture which are prepared from curable elastomeric or deformable thermoplastic matrices having distributed therein polymeric powders which have a melting point below the degradation of the matrix and which are present in shape-holding amounts to permit reshaping subsequent to elastomer cure.

37 Claims, 2 Drawing Sheets
(2 of 2 Drawing Sheet(s) Filed in Color)

REFORMABLE COMPOSITIONS

BACKGROUND OF THE INVENTION

1. Field of the Invention

The present invention relates to curable elastomer compositions and reformable thermoplastic compositions which are reshapable subsequent to cure or solidification. In particular, the present invention relates to compositions and articles of manufacture which are prepared from curable elastomeric or deformable thermoplastic matrices having distributed therein polymeric powders which have a melting point below the degradation of the matrix and which are present in shape-holding amounts to permit reshaping subsequent to elastomer cure.

2. Brief Description of Related Technology

Thermoplastics are generally described as polymeric materials consisting of linear long chain molecules which exhibit crystalline and amorphous phases and which exhibit two transitions as a function of temperature (1) a second order transition where softening occurs, called the glass transition temperature (Tg), and (2) a first order transition, called Tm, where melting occurs. Because of the melting behavior, these materials can be reprocessed at elevated temperatures, to any shape desirable. Below the Tg, these materials are strong, stiff materials; above Tg but below Tm, they are strong materials, but less stiff and more extensible. See *Principles of Polymerization*, George Odion, Third Edition, John Wiley & Sons, Inc. (1988).

Elastomer or rubbery materials are linear long chain molecules which have very low Tg's and Tm's (if any, usually below room temperature), have low strength and very high extensibility. Crosslinking the elastomer improves strength and stiffness and decreases extensibility.

Thermoplastic elastomers are polymeric materials which possess properties of both thermoplastic and rubbery materials. Since these are mostly linear chains, they can be reprocessed at elevated temperatures, much like thermoplastics.

When long chain molecules are linked to each other at points other than their ends, the polymers are said to be crosslinked. When the number of crosslinks is sufficiently high, a three dimensional or space network polymer is produced in which substantially all the polymer chains in a sample have been linked to form one great molecule. Light crosslinking sometimes is used to impart good recovery (elastic) properties to polymers to be used as rubbers. A high degree of crosslinking is used to impart high strength, high rigidity and dimensioned stability at elevated temperatures. These highly crosslinked polymers are also called thermoset polymers.

Interpenetrating polymer networks (IPNs) are generally described as materials containing at least two polymers, each in a network or crosslinked form, with the two polymers having polymerized independently in the presence of each other to form two networks which are interwoven (interpenetrated) with each other. In other words, two or more polymerization reactions occur, resulting in separate but interwoven polymers. In some cases, slight crosslinking between the two polymers can also occur. If one or more of the two polymers are elastomeric initially, then the new polymer can be characterized as an elastomeric IPN.

A semi or pseudo-IPN is considered to be a material having only one crosslinked or network structure which is within a non-crosslinked polymer matrix phase, or vice versa. It is conceivable that certain solvents can extract this non-crosslinked phase of the semi-IPN, whereas this is generally not possible for an IPN. Therefore, a single crosslinked network of the semi-IPN allows these materials to retain thermoplastic character. They can be reformed with heat from one shape to another, providing the crosslinked network of the semi-IPN has a degree of elastomeric character, such as silicone segments within the crosslinked structure. Rigid crosslinked semi-IPNs derived from epoxy, bismaleimides or cyanates do not have this reforming ability.

Various patents disclose the case of thermoplastic components in combination with thermoset components. Much of the prior published subject matter modifies the properties of the thermoset by dynamically crosslinking the thermoset within the thermoplastic, i.e., chemically incorporating the thermoplastic into the crosslinked reaction product, rather than maintaining the thermoplastic in a distinct meltable phase within a cured pseudo or fully interpenetrating network structure, as in the present invention.

For example, U.S. Pat. No. 6,013,715, to Gornowicz et al., describes a novel thermoplastic silicone elastomer comprising mixing a thermoplastic resin such as a polyolefin or poly(butylene terephthalate) with a diorganic polysiloxane having at least two alkenyl groups and organo hydrido silicone compounds and subsequently dynamically vulcanizing the system via a hydrosilation cure using a platinum catalyst. Only polyolefin or poly(butylene terephthalate) resins were disclosed as being suitable because many other resins contain certain groups which can "poison" the platinum catalyst. In addition, other resins were unsuitable because they contain residual unsaturation, which depletes the Si—H availability for the crosslinking reaction.

The '715 patent discloses a thermoplastic elastomer product which is a blend of thermoplastic and polyorganosiloxane resin. The reaction process involves a dibutyltindilaurate catalyzed condensation reaction of a polydiorganosilanol with a hydrodiorgano silane. This reference is devoid of any teaching with respect to a curable resin composition containing discrete thermoplastic particles in a pseudo or fully interpenetrating network.

U.S. Pat. Nos. 5,834,537 and 6,225,373, both to Gotro et al., disclose a curable thermosetting resin composition with enhanced fracture toughness as a result of incorporating reactive thermoplastic oligomers therein is described. The curable composition of the '537 patent describes a thermoset resin containing fluorine and at least one fluorine-containing thermoplastic, soluble in the thermoset, which is cured between 100 to 325° C., to yield a toughened phase-separated thermoplastic in a thermoset. The '373 patent discloses a similar composition, wherein the thermoset contains bromine and optionally other halogens.

U.S. Pat. No. 5,709,948 to Perez et al. describe a curable composition made by mixing an epoxy resin and curative with prepolymerized hydrocarbon resin and a fully prepolymerized functionalized polyolefin resin and curing said composition in a twin screw heated extruder following by extrusion. The final composition is a thermoplastic polyolefin in an epoxy resin, the polyolefin being chemically linked to the epoxy via the functionalized groups. The composition described above is a thermoplastic-modified epoxy resin.

U.S. Pat. No. 4,954,195 to Turpin describes a process to produce thermoset composites by dissolving thermoplastic particles of polyimide, polyphenylenesulfide, or polyethersulfone, ranging in size from about 10 to 80 microns, in a thermoset resin at the cure temperature of the thermoset, which can be a bismaleimide (BMI) or an epoxy. This composition is applied as fiber reinforcements to form prepregs, and cured at elevated temperatures to form a soluble thermoplastic in a rigid thermoset composite.

U.S. Pat. No. 5,952,416 to Tani et al. describe a thermosetting resin composition containing thermoplastic polyolefin powder of particle sizes up to 200 µm and potassium titanate filler fibers, said thermoset being derived from unsaturated polyesters, vinyl esters, phenolic resin, polyester/styrene or epoxy phenolics. Such a product is said to provide high slidability and abrasion resistance.

Other patents disclose the use of pseudo or semi-IPN's. For example, U.S. Pat. No. 4,714,739 discloses pseudo or semi-interpenetrating polymer (IPN) networks of silicones in thermoplastic matrices. The pseudo or semi-IPN's are formed by vulcanization of vinyl containing silicones or hybrid vinyl containing polymers formed by reaction of a hydrid-containing silicone with a vinyl thermoplastic polymer or unsaturated group-containing polymer such as poly (1,2-butadiene), with a hydride-containing silicone polymer using a platinum catalyst, in the presence of a thermoplastic resin such as nylon or polyethylene or polyester urethane at the melt temperature of the thermoplastic resin. The level of semi-IPN in the thermoplastic matrix is demonstrated at low levels of 5 to 20%. An intimate blend of the mixture is cured and melt-processed in the injection molding equipment at 350° C. The process requires intimate mixing of the melted thermoplastic with reacting silicone components at the melt temperature of the thermoplastic to form the semi-IPN thermoplastic elastomer. This patent discloses the production of a semi-IPN, containing about 5 to 20% silicone networks, in a thermoplastic matrix. No disclosure is provided with respect to curable compositions which can be reshaped or reformed subsequent to cure.

U.S. Pat. No. 5,866,258 to Lucas describes an IPN composition made in two steps: (1) crosslinking an aqueous dispersion of isocyanate based thermoplastic polymer and unsaturated monomers containing latent reactive functional groups using peroxide initiators to form a stable coating composition, and (2) further reacting the composition at elevated temperatures (95-175° C.) to form a self-crosslinked IPN composition. Vinyl monomers containing latent reactive groups include acrylic acid, allylalcohol, vinyl acryloxy ether, 2-isocyanatoethylmethacrylate, meta-isopropenyl-α, α-dimethyl benzylisocyanate, and hydroxyethylacrylate. This IPN composition does not result in a discrete, meltable thermoplastic component in a cured elastomeric matrix.

U.S. Pat. No. 5,980,923 to Dillon describes an elastomeric membrane or sheeting material formed from polydimethylsilicone (PDMS) and polytetrafluoroethylene (PTFE). A semi-interpenetrating network is formed by causing a matrix of PDMS and a matrix of PTFE to be formed in situ. The membrane, which is used for treatment of dermatological scars, is further coated with a separate PDMS layers to form the final product.

At the present, there is a need for curable compositions which can be reshaped or reformed subsequent to cure, without destroying or degrading the crosslinked structure.

SUMMARY OF THE INVENTION

The present invention provides polymer compositions which can be reshaped subsequent to their initial solidification. The polymer compositions contained a finely divided particulate, or powder, of a meltable polymer incorporated in a matrix of a different polymer. The combination of the meltable polymer and the polymer matrix forms a full or semi IPN. The meltable polymeric powder has a melting range which is lower than the polymer matrix in which it is incorporated, and is present in the polymer matrix in sufficiently high amounts to dictate the shape of the matrix when solidified. More particularly, the compositions of the present invention permit reforming, reshaping or reconfiguring their solid forms by heating the solid to the melting temperature of the meltable polymeric powder, reshaping the solid, for example using a mold or applying appropriate pressure, to form a new configuration and permitting the composition to cool, thereby setting the composition in its newly formed shape.

Our indication of the flexibility of the polymeric matrix is the elongation property. Generally, the polymeric matrices of the present invention have an elongation modulus of about 5% to 1000% at 25° C. and a hardness range of about 20 to 90 shore A.

For purposes of this invention, elastomeric recovery strength is the force extended by the elastomer when the elastomer returns to the shape in which it was cured from a strength or strained state.

The amount of thermoplastic powder present must be sufficient such that when it is allowed to melt and reform as a solid, it will impart sufficient rigidity strength to overcome the elastomeric recovery strength and hold the article in its new configuration. This amount is called the "shape-holding" amount.

In one aspect of the invention, there is provide a curable composition which includes a blend of (a) a crosslinkable component which forms an elastomer when cured; and (b) distributed within said crosslinkable component in a shape-holding amount, a polymeric powder which remains discrete in the cured elastomer and has a melt temperature below the degradation temperature of the cured elastomer; wherein the curable composition can be reshaped subsequent to cure.

In another aspect of the invention, there is provided a composition which includes the reaction product formed by curing: (a) a crosslinkable component which forms an elastomer when cured; and (b) distributed within said crosslinkable component a shape-holding amount of a polymeric powder which remains discrete in the cured elastomer and has a melt temperature below the degradation temperature of the cured elastomer; wherein the curable composition can be reshaped subsequent to cure.

In yet another aspect of the invention, there is provided a reformable article of manufacture which includes a cured elastomeric matrix having distributed therein in a shape-holding amount a polymeric powder which melts below the degradation temperature of the elastomeric matrix and which upon heating permits reshaping of the article.

In a still further aspect of the invention, there is provided a method of preparing a cured, reformable composition which includes: (a) providing a crosslinkable component which forms an elastomer when cured; and (b) dispensing within said crosslinkable component in a shape-holding amount of a polymeric powder which melts below the degradation temperature of the cured elastomer and which remains discrete therein.

In yet another aspect of the invention, there is provided an electrical wire or cable which can be reshaped upon the application of heat which includes: (a) an electrical wire or cable; and (b) a coating for said wire including: (i) a crosslinkable component which forms an elastomer when cured; and (ii) distributed within said crosslinkable component a shape-holding amount a polymeric powder which remains discrete in the cured elastomer and has a melt temperature below the degradation temperature of the cured elastomer; wherein the curable composition can be reshaped subsequent to cure.

In another aspect of the invention, there is provided a reformable polymeric composition which includes: (a) a flexible or elastomeric polymer; and (b) a meltable polymeric powder distributed within said flexible or elastomeric polymer and having a melting range lower than said flexible or elastomeric powder, said powder and polymer forming an interpenetrating network, wherein said powder is present in amounts sufficient that upon melting and cooling of said powder, the shape or configuration of said composition can be modified.

In another aspect of the invention, there is provided a shape memory to a deformable substrate which includes a method of providing shape memory to a deformable substrate which includes: (a) providing a deformable substrate having applied thereto a coating comprising: (i) a flexible or elastomeric polymer; and (ii) a meltable polymeric powder distributed within said flexible or elastomeric polymer and having a melting range lower than said flexible or elastomeric powder, said powder and polymer forming an interpenetrating network, wherein said powder is present in amounts sufficient that upon melting and cooling of said powder, the shape or configuration of said composition can be modified; (b) heating the coated substrate to the melting range of the polymeric powder; (c) shaping the deformable substrate to the desired shape; and (d) cooling the shaped substrate to permit solidification of the polymeric powder and retention of the thus formed shape.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Flexible Polymeric Matrices

Figure 1:
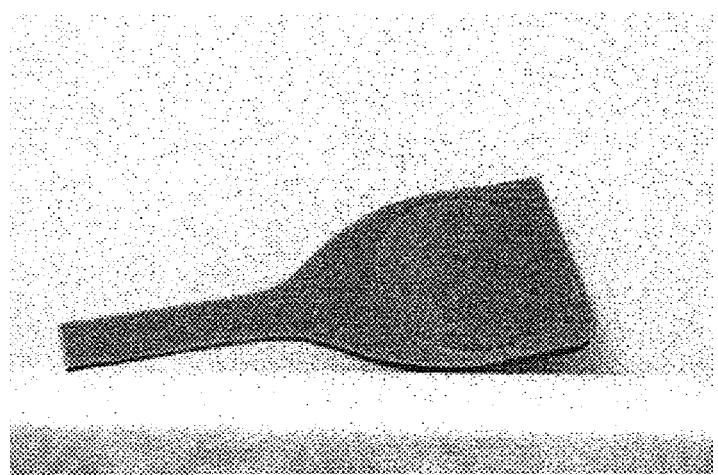
FIG. 1 shows a photomicrograph of a sample of the inventive composition which has been reshaped subsequent to initial cure of the elastomeric matrix.

The polymeric matrices may be selected from a variety of flexible thermoplastic polymers, or more desirably from various elastomeric thermoset polymer compositions. The need for flexibility or elastomeric properties in the polymeric matrix is to permit the solidified matrix to be sufficiently deformable such that it can be reshaped or reconfigured without the requirement of melting or degrading the matrix. For example, in the case of a thermoplastic polymeric matrix, reshaping would occur at a temperature which melts only the meltable polymeric powder and not the polymeric matrix. Thus, the thermoset polymer must be capable of being deformed into a new shape and subsequently constrained in this new shape by solidification of the polymeric powder. In the case of a thermoset polymeric matrix, the elastomeric matrix is sufficiently deformable to a new shape and held in this new shape by solidification of the polymeric powder.

The polymeric matrices of the present invention are preferably curable silicone compositions. Various types of silicone compositions may be employed. For example, heat curing silicone compositions, moisture curing silicone compositions and photocuring silicone compositions may be employed. Polymodal curing silicone compositions, for example photo and moisture dual curing compositions, or heat and moisture dual curing silicone compositions are also useful.

Desirably, the silicone compositions are heat cure compositions. In particular, such heat cure silicone compositions include reactive polyorganosiloxanes containing reactive functional groups such as vinyl or allyl groups, or (meth) acrylate groups. In addition to the reactive polyorganosiloxanes, such heat curing compositions also include a silicon hydride cross-linker and an organo-metallic hydrosilation catalyst.

Examples of useful reactive polyorganosiloxanes which may be employed in heat curing silicone compositions include those which conform to Formula I below:

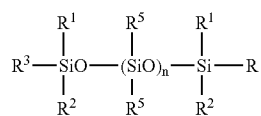

I where $R^1$, $R^2$, $R^3$ and $R^5$ can be the same or different and are substituted or unsubstituted hydrocarbon or hydrocarbonoxy radicals from $C_{1-20}$, provided that at least two of these R groups, and desirably more than two, are reactive functional groups such as olefinic groups, including vinyl, (meth) acrylate, maleate and cinaminate groups. For example, when one or more of the aforementioned R groups ($R^1$, $R^2$, $R^3$ and $R^5$) is not one of the required reactive functional groups, they can be chosen from alkyl radicals such as methyl, propyl, butyl and pentyl; alkenyl radicals such as vinyl and allyl; cycloalkyl radicals such as cyclohexyl and cycloheptyl; aryl radicals such as phenyl; arylalkyl radicals such as betaphenylethyl; alkylaryl radicals; and hydrocarbonoxy radicals such as alkoxy, aryloxy, alkaryloxy, aryalkoxy, and desirably methoxy, ethoxy or hydroxy, and the like. Any of the foregoing radicals having some or all of the hydrogen atoms replaced, for example, by a halogen such as fluorine or chlorine, are also useful. One or more of the aforementioned R groups can also be hydrogen, provided the required reactive functional group is present as indicated and the presence of the hydrogen does not deleteriously interfere with the ability of the polyorganosiloxane to perform in the present invention. $R^3$ in the above formula desirably is:

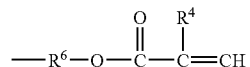

where $R^6$ is a substituted or unsubstituted hydrocarbon radical $C_{1-20}$ and desirably is an alkyl group such as propyl; and $R^4$ is H or $CH_3$.

The number of repeating units in the reactive polyorganosiloxanes can be varied to achieve specific molecular weights, viscosities and other chemical or physical properties. Generally n is an integer such that the viscosity is from about 25 cps to about 2,500,000 cps at 25° C., such as when n is from 1 to 1,200 and desirably from 10 to 1,000.

The reactive polyorganosiloxanes of the present invention may include as part of their backbone one or more divalent substituted or unsubstituted $C_{1-20}$ aliphatic, cycloaliphatic or aromatic hydrocarbon radicals, which may be interrupted with a heteroatom-containing linkage. The heteroatom may include N, O or S. Among the useful divalent hydrocarbon radicals include alkylenes, polyolefins, polyethers, polyesters, polyurethanes and combinations thereof.

Desirably the reactive polyorganosiloxane has formula II below:

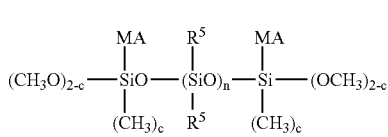

where MA is a methacryloxypropyl group, n is from 1 to 1,200 and c is 0 or 1; and $R^5$ is a substituted or unsubstituted hydrocarbon or hydrocarbonoxy radical from $C_{1-20}$ as further defined herein.

The reactive polyorganosiloxanes should be present in amounts of about 50 to about 95%, and desirably in amounts of about 60 to about 80% by weight.

Silicon hydride crosslinker compounds may also be incorporated, and are particularly useful in heat curing compositions. These materials may be selected from a wide variety of compounds, although the crosslinker desirably conforms to formula III below:

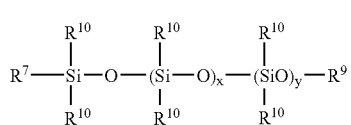

where at least two of $R^7$, $R^8$ and $R^9$ are H; otherwise $R^7$, $R^8$ and $R^9$ can be the same or different and can be substituted or unsubstituted hydrocarbon radical from $C_{1-20}$ such hydrocarbon radicals including those as previously defined for formula I above, thus, the SiH group can be terminal, pendent or both; $R^{10}$ can also be a substituted or unsubstituted hydrocarbon radical from $C_{1-20}$ such hydrocarbon radicals including those as previously defined for formula I above, and desirably is an alkyl group such as methyl; x is an integer from 10 to 1,000; and y is an integer from 1 to 20. Desirably R groups which are not H are methyl. The silicon hydride crosslinker should be present in amounts sufficient to achieve the desired amount of crosslinking and desirably in amounts of about 1 to about 10% by weight of the composition.

Useful organo-metallic hydrosilation catalyst may be selected from any precious metal or precious metal-containing catalyst effective for initiating a thermal hydrosilation cure reaction. Especially useful are the platinum and rhodium catalysts which are effective for catalyzing the addition reaction between silicone-bonded hydrogen atoms and silicone-bonded olefinic groups. Examples of platinum or platinum-containing complexes include platinum metal on charcoal, the platinum complexes descried in U.S. Pat. Nos. 3,159,601 and 3,159,662, the platinum alcoholate catalysts described in U.S. Pat. No. 3,220,970, the platinum catalyst described in U.S. Pat. No. 3,814,730 and the platinum chloride-olefin complexes described in U.S. Pat. No. 3,516,946. Each of these patents relating to platinum or platinum-containing catalysts are expressly incorporated herein by reference.

Other classes of catalysts useful in the present invention include organo rhodium and platinum alcoholates. Complexes of ruthenium, palladium, oznium and arridium are also contemplated. The organo metallic hydrosilation catalyst may be used in any effective amount to effectuate thermal curing. Desirably the catalyst is present in amounts of 0.025% to about 1.0% by weight. Combinations of catalysts are contemplated.

The polymeric matrices of the present invention are present in amounts of about 20 to about 80% by weight of the total composition. When curable silicone compositions are used as the polymeric matrix, the polyorganosiloxanes are present in amounts of about 20 to about 95% and desirably in amounts of about 40 to about 60% by weight of the polymeric matrix. The silicone hydride cross-linker may be present in amounts of about 1 to about 10% by weight of the polymeric matrix.

The vulcanization (curing) reaction can be defined as any treatment that increases the viscosity of the elastomers, increases the tensile strength and modulus, and strain-to-failure. This process can be described as a crosslinking reaction between polymer molecules, which also includes chain extension as well as crosslinking. Included among the useful silicone polymers are liquid vinyl containing esters or ethers.

Silicones useful in the present invention include those having viscosities in the range between about 500 and about 100,000 cps, with polymers having viscosities of between about 1,000 to about 10,000 cps being more desirable.

The hydride-containing silicone polymers that can be employed in the present invention have viscosities in the range of about 35 to 10,000 cps.

Among the commercially available reactive silicones useful in the present invention include the following:

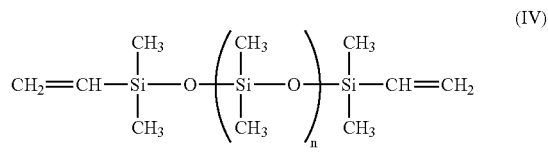

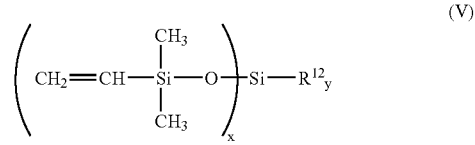

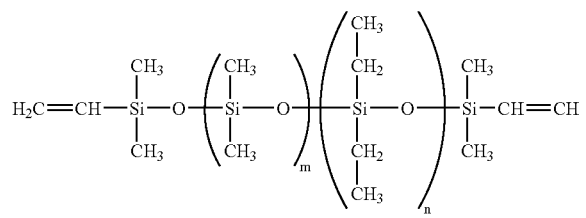

-continued

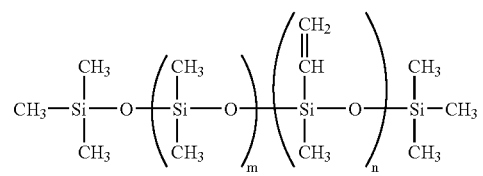
VII

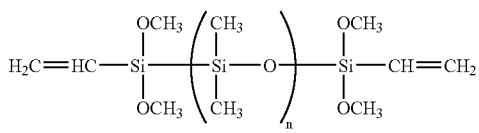
VIII

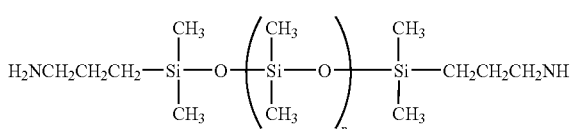
IX

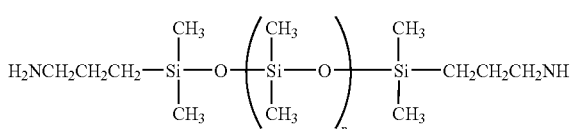
X

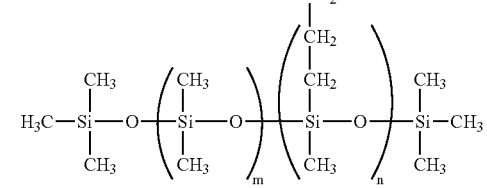
XI

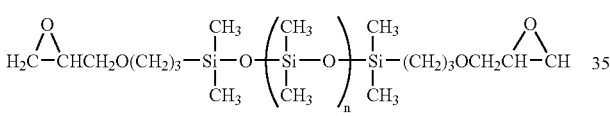
XII where $R^{12}$ is $C(H)_{4-x}$; x=2-4; y=0-1; n=1-1200; and m is 0-1200.

In a further embodiment of the invention vinyl-containing esters such as alkylene diol dialkylacrylate esters, 1

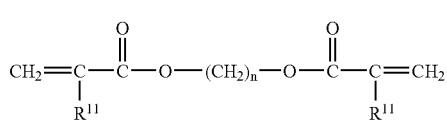

where each $R^{11}$ is independently H or $CH_3$ and n is 2-23; and desirably 6;

glycerol trialkylacrylate, 2

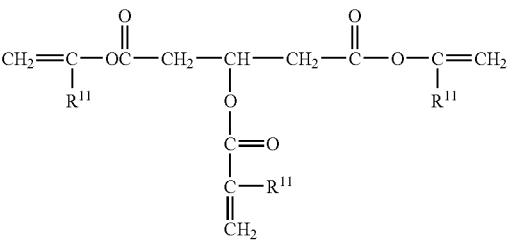

where each $R^{11}$ is independently H or $CH_3$;

diallylsuccinate, 3

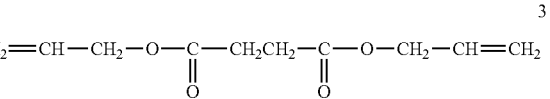

diallylmaleate, 4

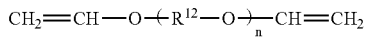

and vinyl-containing polyethers, 5

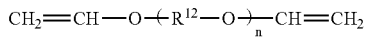

where $R^{12}$ is a substituted or unsubstituted $C_{2-20}$ alkylene group, which may optionally contain unsaturated groups or pending alkyl groups, n=1 to 100, and preferably 1-4; can replace the vinyl containing silicones, at levels from 70% to 100%, depending on the resultant viscosity of the vinyl resin and hydride containing silicone resin. A desirable blend of vinylester and vinyl silicones is 1:1, and a desirable ratio of vinyl esters within the blend is 2/1/2/1 for esters 1, 2, 3, and 4, respectively. In another aspect of the invention there is provided a composition which includes divinyl end-capped polyether 5 at levels of 30 to 70%, which can replace the vinyl esters. A desirable blend of polyether 5 with a vinyl silicone is 1:1. The ratio of hydride groups to vinyl groups regardless of the source is desirably between 1.2:1 to 6:1.

Polymeric Powder Filler Materials

Among the useful thermoplastic fillers (powders, particulates) are polyolefins or copolyolefins such as polyethylene, polypropylene, polyethylene-co-propylene, polybutadiene (72% cis, 28% trans), polycapralactone, isotactic poly(1-butene), syndiotactic polypropylene, poly(1-decene), poly(ethylene-co-1-butene), poly(ethylene-co-vinylacetate), polybutylene adipic acid), poly(α-methyl styrene-co-methylstyrene), polyethylene oxide, trans 1,4-polybutadiene or trans 1,4-polyisoprene. These solid polymers are particulates which become liquid (melt) at temperatures below the temperatures at which the polymeric matrix degrades and upon cooling, solidify within the matrix. The cured polymeric matrix now contains discrete crystalline or amorphous polymeric powder interspersed therewith, such that a pseudo or fully interpenetrating network is formed. When the cured polymer network is subjected to heat above the melting point of the thermoplastic powder, it forms a liquid pool, which consumes heat, due to the melting process, therefore acting as a heat sink. Upon cooling below the melting point of the polymeric particulates, solidification occurs, and the material retains its mechanical properties as before heating. The thermoplastic particle is not intended to undergo a chemical reaction with the resin system but becomes encapsulated as a discrete particle. In some instances it is conceivable that minor chemical reactions between the thermoplastic particle and the resin system may occur, and such minor reactions, if present, do not appear to detract from the present invention. The curable matrix may include the meltable polymeric filler at a level of 1 to 80 wt. % or 0.1 to 10 parts of filler to one part of curable resin. The melting range of meltable polymer that can be used in the polymeric matrix desirable falls between about 60° C. to 180° C. Blends of crystalline filler with different melting points can be used in the inventive compositions.

The polymeric powders of the present invention may include low density particles, high density particles or a combination thereof. Particle sizes of the powders may vary widely from the submicron range, up to about 100 microns. Desirably, the particles have a size range of about 5 to about 10 microns.

The polymeric powders of the present invention may be included in a wide range of molecular weights. For example, molecular weight materials from about 500 to about 5 million are useful. Molecular weight ranges from 10,000 to 500,000 are particularly useful.

Non-meltable inorganic fillers may optionally be used for purposes of achieving various mechanical and or chemical properties. The aggregate of inorganic fillers used in the curable resin composition may be from about 20 to about 30 wt. % of the total mass or about 0.7 parts of filler to one part of curable polymeric matrix resin. In order to provide for good surface interaction of the filler with curable silicone resins, the inorganic fillers are surface treated with hexamethylsilazane at a level of 0.1 part of hexamethylsilazane to one part of filler. The filler components of the present invention include fumed silicas, crushed quartz, carbon black and calcined alumina. The presence of the inorganic filler prevents aggregation of the polymeric thermoplastic filler particles and layering of the particles within the uncured composition.

The photoinitiators useful in the present invention may be selected from any known free radical type photoinitiator effective for promoting crosslinking. For example, suitable photoinitiators include UV initiators such as benzophenone and substituted benzophenones, acetophenone and substituted acetophenones, benzoin and its alkylesters, xanthene and substituted xanthones. Desirable photoinitiators include diethoxyacetophenone, benzoin methyl ether, benzoin ethyl ether, benzoin isopropyl ether, diethoxyxanthone, chlorthio-xanthone, azo-bisisobutyronitrile, N-methyl diethanolaminebenzphenone, and combination thereof.

Visible light initiators include camphoroquinone peroxyester initiators and non-fluorene-carboxylic acid peroxyesters.

Particularly desirable photoinitiators include diethoxyacetophenone (DEAP). While the photoinitiator may be present in any effective amount, desirable ranges include about 1 to about 10% by weight, and about 2 to about 6% by weight.

The curable organopolysiloxanes used for the polymeric matrices of the present invention can optionally contain one or more hydrolyzable groups in addition to the olefinic unsaturated group. In such cases, the composition is then capable of moisture curing. Such moisture curing composition further include a moisture curing catalyst. Non-limiting examples of hydrolyzable groups useful in the present invention include amino, oxime, hydroxyl, alkoxy, aryloxy, alkaryloxy, aryalkoxy and the like.

Useful ultraviolet radiation sources include conventional mercury-vapor lamps designed to emit ultraviolet energy in various ultraviolet wavelength bands. For example, useful radiation wavelength ranges include 220 to 400 nms.

It should be understood that while the photoinitiator is generally used as a separate component, the formulations used in the inventive composition are intended to include those in which photoinitiating groups are included in the backbone of the same organopolysiloxane polymer which includes the photocuring groups.

Various cure mechanisms may be employed, alone or in combination. Free radical curing, condensation curing and cationic curing mechanisms are useful. Heat curing, moisture curing, photo curing (i.e., uv or visible light) or a combination of these are useful.

The inventive compositions may also contain other additives so long as they do not interfere with the curing mechanisms. For example, conventional additives such as fillers, promoters, pigments, moisture scavengers, inhibitors, photosensitizers and the like may be included. Fillers such as fumed silica or quartz are contemplated, as are moisture scavengers such as methyltrimethoxysilane and vinyl trimethoxysilane. Fillers may be present in amounts up to about 30%, such as in amounts of about 5 to about 20%. Inhibitors may be present in amounts of about 10%, such as in amount of about 0.5 to about 1% by weight. The particular amount of inhibitor may be required to be carefully balanced in a given composition to produce or improve stability of the composition. Adhesion promoters may be present in amounts of up to about 5%, such as in amounts up to about 2% by weight.

Among the more desirable final cured composition is a pseudo or fully interpenetrating network of crosslinked silicones in which a polyethylene powder becomes intertwined in this network, as discrete particles in the melt state during the curing process. As mentioned above, silicone polymers are desirable, but other polymers may be employed. This interpenetrating network of polymer/crystalline thermoplastic filler affords unique properties to the thermoset system. Among the advantages of the inventive compositions are:

exhibit improved mechanical and chemical resistance;

provide spatial memory to the matrix on transition to below the melt temperature of the crystalline thermoplastic filler;

allow incorporation of chemicals, liquid or gaseous, in the matrix normally incompatible with or undesired in, the uncured formulation;

aid in removal of heat from sensitive devices in situations where heat transfer to the outside is not possible, or the system can act as a heat storage medium;

provide a liquid phase with the solid matrix on reaching the melt temperature of the crystalline thermoplastic particulate (powder) filler, allowing reshaping and attachment of the bulk matrix to various substrates;

allow partial healing of a damaged matrix on heating to above the melt temperature of the crystalline thermoplastic filler.

This invention is further described by reference to the following specific, non-limiting examples.

EXAMPLES

Example 1

Preparation of Inventive Composition A

A homogenous physical blend of the following curable composition in Table 1 was prepared by the following process:

A vinyl end capped polydimethysiloxane resin (I), with a viscosity in the range of 500 to 10,000 cps, was mixed with a multi-vinyl containing dimethylsiloxane-methylvinyl siloxane copolymer (II) with a viscosity in the range of 250 to 1,000 cps at a weight ratio of two parts (I) to one part (II). To this stirred mixture was added hexamethylsilazane (HMDZ) treated filler, pretreated with 0.1 part of hexamethylsilazane for every part of total filler, the filler being added at a level of 0.67 parts of filler for every part of vinyl polydimethylsiloxane (PDMS) resin. The HMDZ was added with water and heated to about 110° C. with stirring for about 2 hours, then vacuum and further mixing with heat was continued for about another hour. The inorganic filler was a composition which included fumed silica, crushed quartz, carbon black and calcined alumina at weight ratios of 100:796:1:10, respectively. The vinyl PDMS/thermoplastic filler/inorganic filler composition was stirred, until such time that a homogenous mixture was attained, then cooled to room temperature. To this room temperature-cooled mixture, while stirring vigorously, the remainder of components were added, such as a crosslinker/chain extender system including a hydride functional polydimethylsiloxane (PDMS), present in two parts of hydride terminated PDMS to one part of hexamethylsilyl terminated methylhydrodimethylsiloxane copolymer. The crosslinker/chain extender was added to the mixture at a level of 0.07 parts of hydride PDMS for every part of vinyl PDMS resin, such that the ratio of the hydride groups to said vinyl groups was between about 1.2:1 and about 6:1. To this mixture at room temperature was added crosslinking agents 2,4,6,8-tetramethylvinylcyclotetrasiloxane (vinyl D4) and trimethoxyvinylsilane at a ratio of vinyl D4 to trimethoxyvinylsilane of 2 to 1. The crosslinking agents were added to the mixture at a level of 0.4 parts of crosslinking agents to one part of hydride containing PDMS. Finally, to the room temperature stirred mixture was added water at a level of 0.7 parts of water to one part of trimethoxyvinylsilane, and platinum catalyst complex (platinum-tetravinyltetramethylcyclotetrasiloxane complex) at a level of 0.1 part of platinum to every part of tetravinyltetramethylcyclotetrasiloxane. The mixture at this point was a homogenous curable mixture of resins, crystalline polyethylene powder, inorganic fillers, curing agents and extenders, stabilizers and catalysts. This curable homogenous dispersion (Inventive Composition A) was then cured at a temperature of 150° C. for one hour to form an IPN.

TABLE 1

| Components** | Inventive Composition A | Inventive Composition B | Comparative Composition C |
|---|---|---|---|
| Divinyl PDMS | 21.2 | 29.13 | 35.46 |
| Multivinyl PDMS | 11.17 | 15.31 | 18.64 |
| Fumed silica | 2.40 | 3.29 | 4.00 |
| Crushed quartz | 19.16 | 26.27 | 31.90 |
| Carbon black | 0.02 | 0.032 | 0.04 |
| Calcined alumina | 0.24 | 0.32 | 0.40 |
| Hexamethyldisilazane | 2.09 | 2.86 | 3.48 |
| Distilled water | 0.21 | 0.28 | 0.35 |
| Hydride terminal PDMS | 1.55 | 2.12 | 2.58 |
| Multihydride PDMS | 0.75 | 1.02 | 1.25 |
| 2,4,6,8-tetravinyltetramethyl cyclotetrasiloxane | 0.60 | 0.82 | 1.00 |
| Trimethoxyvinylsilane | 0.30 | 0.41 | 0.50 |
| Hexynol | 0.18 | 0.24 | 0.30 |
| Platinum | 0.06 | 0.08 | 0.10 |
| Polyethylene powder* | 40.07 | 17.82 | 0 |
| Total | 100 | 100 | 100 |

*thermoplastic particulate filler
**all amounts are in weight %

The cured composition was then cooled to room temperature. The cured material on reheating to about 150° C. in a differential scanning calorimeter (DSC) exhibits an endotherm with onset at about a temperature of 103° C., peaking at a temperature of 116° C., with a energy absorption, DH of 36.6 J/g. This corresponds to the melting of the polyethylene powder in the cured thermoset matrix. The same composition without polyethylene did not show this endotherm.

Upon reheating to a temperature of 150° C., the cured material was reconfigured from a flat shape into a different shape. Once cooled, the new shape was retained. The elastomer remained intact. The elastomer was restrained in the new shape by the resolidification of the thermoplastic powder.

FIG. 1 shows a cured "dog bone" shaped sample of the inventive Composition A (Example 1) which was subsequently heated to about a temperature of 150° C. to melt the thermoplastic particulate without degrading the cured silicone elastomer.

An impression was formed in sample during heating by depressing and holding a coin against the sample until the sample was cooled below the thermoplastic particulate melt temperature. The cured silicone was sufficiently deformable to permit the impression to be made. The impression was retained in the cured elastomer by the solidification of the thermoplastic powder therein.

Figure 2:
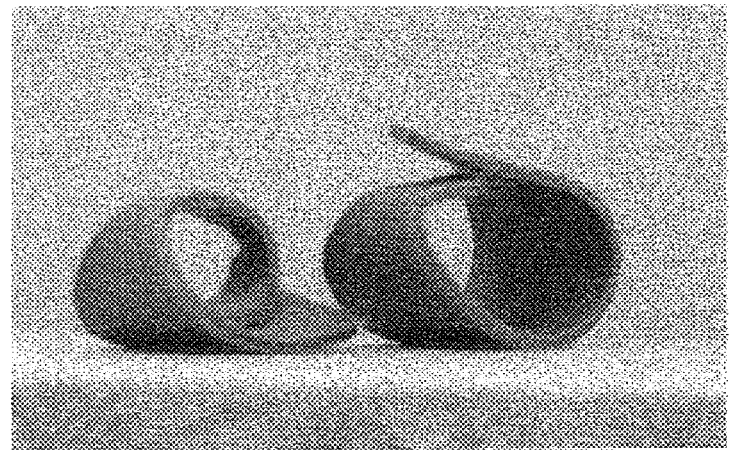
FIG. 2 shows a photomicrograph of two specimens of the inventive composition which have been reshaped from their original flat "dog bone" shape into rolled-up shapes.

Cured dog bone samples using the inventive Composition A were similarly heated and rolled-up to form the shapes as shown in FIG. 2. These shapes were retained once the temperature was below the melting range of the thermoplastic particulate.

Figure 3:
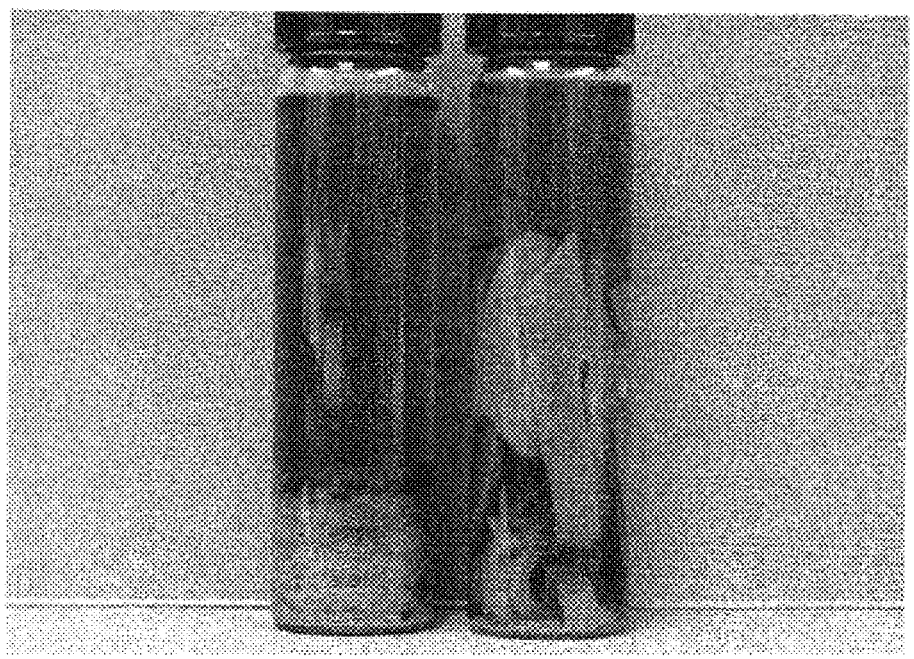
FIG. 3 shows a photomicrograph of the cured samples of the inventive composition and the same composition without the polymeric powder, after immersion in hydrocarbon-based acidic medium (SU 100), available from Silicones Unlimited, Marietta, Ga., for 90 days at 25° C.

Two vials filled with SU 100, an acidic hydrocarbon fluid, obtained from Silicones Unlimited, Marietta, Ga., were used to immerse strips of cured Composition A and a comparative composition which was substantially the same composition without the thermoplastic particulate. As seen from FIG. 3, the comparative composition (on the left) showed substantial degradation and loss of structural integrity as compared to the inventive composition (on the right).

Example 2

The properties of a cured sample of inventive Composition A was compared with Comparative Composition C. These properties are provided in Table 2.

TABLE 2

|  | Inventive Composition A | Comparative Composition C |
|---|---|---|
| Tensile strength, psi | 557.5 | 489 |
| Aluminum to aluminum tensile lap shear strength gap, psi | 705 | 234 |
| Volume resistivity ohns-cure | +.5E+15 | 4.2E+14 |
| Surface resistivity ohns | >8.0E+16 | 1.83E+15 |
| Dielectric strength V/mil | >491 | 459 |
| Elongation at break | 171.5 | 33.8 |
| Shore A hardness | 41 | 80 |

Example 3

A cured sample of Inventive Composition A was compared with a cured sample of Comparative Composition C, by dynamic mechanical analysis.

TABLE 3

|  | DMA-Cl $H_2$ | |
|---|---|---|
| Storage Modulus at: | Inventive Composition B | Comparative Composition C |
| −50° C. | 2.6E+08 | 1.7E+07 |
| 55° C. | 8.8E+06 | 1.6E+06 |
| 150° C. | 1.2E+06 | 1.8E+06 |

At low temperature (−50° C.), the bulk silicone properties are noted; however, near or above the melt temperature of polyethylene, the physical properties reflect that of a crosslinked silicone formulation. The melted polymer remained in the solid silicone matrix at the melt temperature, and even under pressure it did not leach out of the solid structures.

Composition A and the comparative composition of Examples 2 and 3 were used to prepare tensile lap shear joints made from polyphenylene sulfide/polyphenylene sulfide adherents, cured at 150° C. for 1 hour and then tested for gasohol resistance. The results are provided in Table 4.

TABLE 4

| Composition | Tensile lap shear strength (psi) (immersion in gasohol) | Weight gain after 24 hours in gasohol at room temperature wt % |
|---|---|---|
| Composition A | 258 after 7 days | 37 |
| Comparative Composition C, without polyethylene particulate filler | 162 after 5 days | 87 |

As indicated in Table 4, Inventive Composition A provided in a 124% reduction in the weight gain of gasohol as compared to Comparative Composition C.

As is apparent from these results, the inventive composition shows increased gasohol resistance, as indicated both by the maintenance of high tensile strength and the lower gasohol absorption.

Example 5

This example demonstrates the shape memory characteristics of the inventive compositions.

Strips (12"×36"×1") of the cured samples of Composition A, with and without the thermoplastic particulate filler, were rolled up into a 8" diameter roll, maintained in this state while heating above the melting temperature of polyethylene and cooled to room temperature in the restrained state. The cured inventive strip retained the newly formed rolled-up shape, while the cured strip without the polymeric powder unraveled to the original flat position.

Example 6

Cured strips of material prepared as described in Example 1 were immersed in SU100 (hydrocarbon based cured medium). Cured strips of cured silicone of formulation A without polyethylene particulate filler were also tested. The polyethylene-containing silicone material showed very little swelling and deterioration while the silicone material without the filler swelled and disintegrated.

The present invention of a polymeric particulate filler in a matrix of curable resin allows for the ability to formulate other novel materials. For example, inclusion of chemicals or catalysts or gases within the thermoplastic filler particles before the material is introduced into the silicon resin formulation can result in a material with various properties, depending on the material in the particle. For example, incorporation of the platinum catalyst within the meltable filler will allow formulation of one component system that will release the catalyst into the formulation once the filler has melted. Incorporation of crosslinking agents with the filler would enable filler to be crosslinked via heat or radiation to produce novel materials. Incorporation of a foaming catalyst within the meltable filler will allow for the formulation of a foamed product containing polyethylene particles to stiffen the silicone foam.

What is claimed is:

1. A curable composition comprising:
   (a) a crosslinkable component which forms an elastomer when cured; and
   (b) distributed within said crosslinkable component in a shape-holding amount, a Polymeric powder which remains discrete in the cured elastomer and has a melt temperature below the degradation temperature of the cured elastomer;
   wherein once cured, the curable composition can be reshaped by melting the polymeric powder and holding the cured composition in a shape until the melted polymeric powder resolidifies, wherein the elastomer is selected from the groups consisting of polyacrylates, polyurethanes, styrene-butadiene copolymers, polyesters, polyethers, polystyrene, polyamides, polybutadiene and combinations thereof.

2. The composition of claim 1, wherein the crosslinkable component is present in amounts of about 10 to about 90 wt %.

3. The composition of claim 1, wherein components (a) and (b) are present at a ratio of about 1:10 to about 10:1.

4. The composition of claim 1, wherein the crosslinkable component includes a compound having the formula:

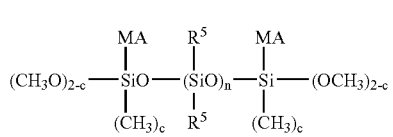

II wherein MA is a methacryloxypropyl group, n is from 1 to 1,200 and c is 0 or 1; and $R^5$ is a substituted or unsubstituted hydrocarbon or hydrocarbonoxy radical from $C_{1-20}$ as further defined herein.

5. The composition of claim 1, wherein the crosslinkable material is a combination of vinyl end-capped polydimethylsiloxane having the formula (IV)

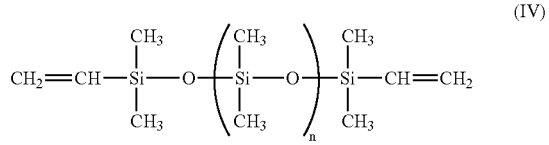

wherein n=0 to 1,200, and a multivinyl containing dimethyl siloxane (V) having the formula:

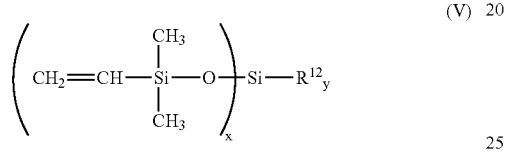

wherein $R^{12}$ is $C(H)_{4-x}$, x=2 to 4 and y=0 to 1.

6. The curable composition of claim 1, wherein the polymeric powder comprises a polyolefin.

7. The composition of claim 1, wherein the polymeric powder is selected from the group consisting of polyethylene, polypropylene, poly(ethylene-co-propylene), syndeotactic polypropylene, polycaprolactone-polybutadiene (72% cis, 28% trans), isotactic poly(1-butene), poly(1-decene) poly(ethylene-co-1-butene), poly(ethylene-co-vinylocetate), poly(butyleneadipic acid), poly(α-methylstyrene co-methylstyrene), polyethylene oxide, trans 1,4-polybutadiene, trans 1,4-polyisoprene, and combinations thereof.

8. The composition of claim 1, wherein the polymeric powder is present in amounts of equal to or greater than 60% wt.

9. The composition of claim 1, wherein the polymeric powder has an average molecular weight of about 500 to about 5 million.

10. The composition of claim 1, further comprising a crosslinker.

11. The composition of claim 1, further comprising a catalyst.

12. The composition of claim 1, further comprising an inorganic filler.

13. The composition of claim 10, wherein the crosslinker is selected from the group consisting of a hydride terminated polydimethylsiloxane, methylhydrosiloxane, and trimethylsilyl terminated methylhydrosiloxane.

14. The composition of claim 11, wherein the catalyst is present at a level of about 0.05 to 0.5 wt %.

15. The composition of claim 10, wherein the crosslinking agents are selected from the group consisting of 2,4,6,8-tetramethyltetravinylcyclotetrasiloxane, trimethyoxyvinylsilane, water and combinations thereof.

16. The composition of claim 12, wherein which the filler is selected from the group consisting of fumed silica, crushed quartz, and carbon black.

17. The composition of claim 12, wherein the inorganic filler is present in amounts of about 5 to about 20 wt %.

18. The composition of claim 1, further comprising a viscosity modifying agent, present at a level of about 1 to about 4 wt %.

19. The composition of claim 1, wherein the polymeric powder has a melting range of about 60° to about 170° C.

20. The composition of claim 1, wherein the polymeric powder has a melting range of about 90° to about 140° C.

21. The composition of claim 1, wherein the polymeric powder has a melting range of 100° to about 120° C.

22. A curable composition comprising:
(a) a crosslinkable component which forms an elastomer when cured; and
(b) distributed within said crosslinkable component in a shape-holding amount, a polymeric powder which remains discrete in the cured elastomer and has a melt temperature below the degradation temperature of the cured elastomer;
wherein once cured, the curable composition can be reshaped by melting the polymeric powder and holding the cured composition in a shape until the melted polymeric powder resolidifies, wherein the crosslinkable component is a vinyl compound containing two or more ester groups.

23. The composition of claim 22, wherein the elastomer is a silicone composition.

24. A curable composition comprising:
(a) a crosslinkable component which forms an elastomer when cured; and
(b) distributed within said crosslinkable component in a shape-holding amount, a polymeric powder which remains discrete in the cured elastomer and has a melt temperature below the degradation temperature of the cured elastomer;
wherein once cured, the curable composition can be reshaped by melting the polymeric powder and holding the cured composition in a shape until the melt polymeric powder resolidifies, wherein the crosslinkable component is selected from the group consisting of an alkylenediol dialkylacrylate, a glycerol trialkylacrylate, a dialkyl succinate and combinations thereof.

25. A curable composition comprising:
(a) a crosslinkable component which forms an elastomer when cured; and
(b) distributed within said crosslinkable component in a shape-holding amount, a polymeric powder which remains discrete in the cured elastomer and has a melt temperature below the degradation temperature of the cured elastomer;
wherein once cured, the curable composition can be reshaped by melting the polymeric powder and holding the cured composition in a shape until the melted polymeric powder resolidifies, wherein said crosslinkable component is selected from one or more compounds corresponding to the following structures:

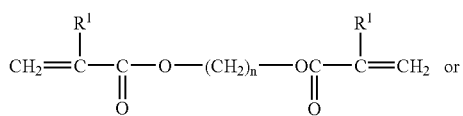

-continued

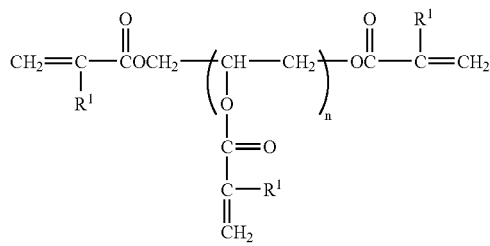
2 wherein $R^1$ is H or $CH_3$ and n=2-6.

26. A curable composition comprising:
(a) a crosslinkable component which forms an elastomer when cured; and
(b) distributed within said crosslinkable component in a shape-holding amount, a polymeric powder which remains discrete in the cured elastomer and has a melt temperature below the degradation temperature of the cured elastomer;
wherein once cured, the curable composition can be reshaped by melting the polymeric powder and holding the cured composition in a shape until the melted polymeric powder resolidifies, wherein the crosslinkable component is selected from one or more of the following compounds:

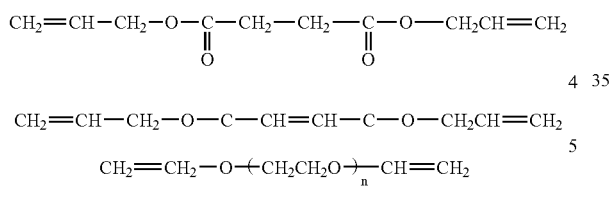

wherein n=1 to 100.

27. A curable composition comprising:
(a) a crosslinkable component which forms an elastomer when cured; and
(b) distributed within said crosslinkable component in a shape-holding amount, a polymeric powder which remains discrete in the cured elastomer and has a melt temperature below the degradation temperature of the cured elastomer;
wherein once cured, the curable composition can be reshaped by melting the polymeric powder and holding the cured composition in a shape until the melted polymeric powder resolidifies, wherein the crosslinkable component comprises a 30/70 to 70/30 mixture of vinyl silicones to vinyl alkylene esters.

28. A curable composition comprising:
(a) a crosslinkable component which forms an elastomer when cured; and
(b) distributed within said crosslinkable component in a shape-holding amount, a polymeric powder which remains discrete in the cured elastomer and has a melt temperature below the degradation temperature of the cured elastomer;
wherein once cured, the curable composition can be reshaped melting the polymeric powder and holding the cured composition in a shape until the melted polymeric powder resolidifies, wherein the crosslinkable component comprises a 30/70 to 70/30 mixture of vinyl silicones to vinyl ethers.

29. A curable composition comprising:
(a) a crosslinkable component which forms an elastomer when cured; and
(b) distributed within said crosslinkable component in a shape-holding amount, a polymeric powder which remains discrete in the cured elastomer and has a melt temperature below the degradation temperature of the cured elastomer;
wherein once cured, the curable composition can be reshaped by melting the polymeric powder and holding the cured composition in a shape until the melted polymeric powder resolidifies, wherein the polymeric powder has an average particle size of from a submicron size to about 100 microns.

30. A curable composition comprising:
(a) crosslinkable component which forms an elastomer when cured; and
(b) distributed within said crosslinkable component in a shape-holding amount, a polymeric powder which remains discrete in the cured elastomer and has a melt temperature below the degradation temperature of the cured elastomer;
wherein once cured, the curable composition can be reshaped by melting the polymeric powder and holding the cured composition in a shape until the melted polymeric powder resolidifies further comprising a catalyst, wherein the catalyst is a complex of 2,4,6,8-tetramethyltetravinylcyclotetrasiloxane and platinum chloride.

31. A curable composition comprising:
(a) a crosslinkable component which forms an elastomer when cured; and
(b) distributed within said crosslinkable component in a shape-holding amount, a polymeric powder which remains discrete in the cured elastomer and has a melt temperature below the degradation temperature of the cured elastomer;
wherein once cured, the curable composition can be reshaped by melting the polymeric powder and holding the cured composition in a shape until the melted polymeric powder resolidifies, further comprising a polymerization inhibitor, present at a level of about 0.10 to about 0.30 wt %.

32. A composition comprising the reaction product formed by curing:
(a) a crosslinkable component which forms an elastomer when cured; and
(b) distributed within said crosslinkable component in a shape-holding amount of a polymeric powder in accordance with claim 29 which remains discrete in the cured elastomer and has a melt temperature below the degradation temperature of the cured elastomer;
wherein once cured, the curable composition can be reshaped by melting the polymeric powder and holding the composition in the same or different shape until the melted polymeric powder resolidifies.

33. A reformable article of manufacture comprising a cured elastomeric matrix having distributed therein in a shape-holding amount a polymeric powder in accordance with claim 29 which melts below the degradation temperature of the elastomeric matrix and which upon heating permits reshaping or me article.

34. A method of preparing a cured, reformable composition comprising:
 (a) providing a crosslinkable component which forms an elastomer when cured; and
 (b) dispensing within said crosslinkable material in a shape-holding amount a polymeric powder in accordance with claim 29 which melts below the degradation temperature of the cured elastomer and which remains discrete therein.

35. An electrical wire or cable which can be reshaped upon the application of heat comprising:
 (a) an electrical wire or cable; and
 (b) a coating for said wire comprising:
  (i) a crosslinkable component which forms an elastomer when cured; and
  (ii) distributed within said crosslinkable component in a shape-holding amount a polymeric powder in accordance with claim 29 which remains discrete in the cured elastomer and has a melt temperature below the degradation temperature of the cured elastomer;
 wherein the curable composition can be reshaped subsequent to cure.

36. A reformable polymeric composition comprising:
 (a) a flexible or elastomeric polymer; and
 (b) a meltable polymeric powder in accordance with claim 29 distributed within said flexible or elastomeric polymer and having a melting range lower than said flexible or elastomeric powder, said powder and polymer forming an interpenetrating network, wherein said powder is present in amounts sufficient that upon melting and cooling of said powder, the shape or configuration of said composition can be modified.

37. A method of providing shape memory to a deformable substrate comprising:
 (a) providing a deformable substrate having applied thereto a coating comprising:
  (i) a flexible or elastomeric polymer; and
  (ii) a meltable polymeric powder in accordance with claims 29 distributed within said flexible or elastomeric polymer and having a melting range lower than said flexible or elastomeric powder, said powder and polymer forming an interpenetrating network, wherein said powder is present in amounts sufficient that upon melting and cooling of said powder, the shape or configuration of said composition can be modified;
 (b) heating the coated substrate to the melting range of the polymeric powder;
 (c) shaping the deformable substrate to the desired shape; and
 (d) cooling the shaped substrate to permit solidification of the polymeric powder and retention of the thus formed shape.

* * * * *